Jan. 22, 1963  M. A. WOODS  3,074,521
RADIANT PANEL ASSEMBLY
Filed March 2, 1959  3 Sheets-Sheet 1

INVENTOR:
MARQUIS A. WOODS
BY
ATT'YS

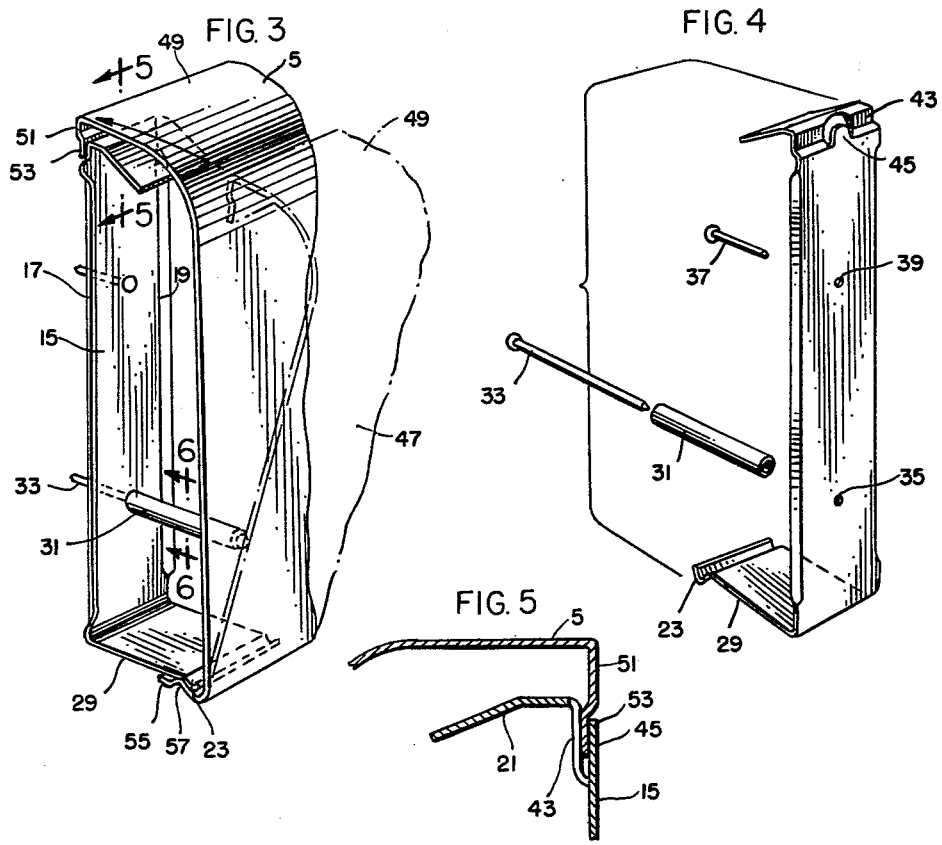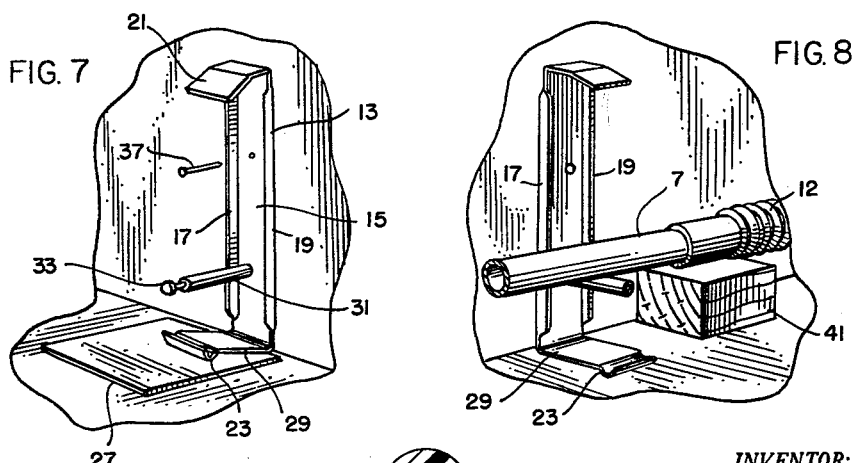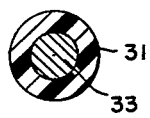

Jan. 22, 1963   M. A. WOODS   3,074,521
RADIANT PANEL ASSEMBLY
Filed March 2, 1959   3 Sheets-Sheet 3
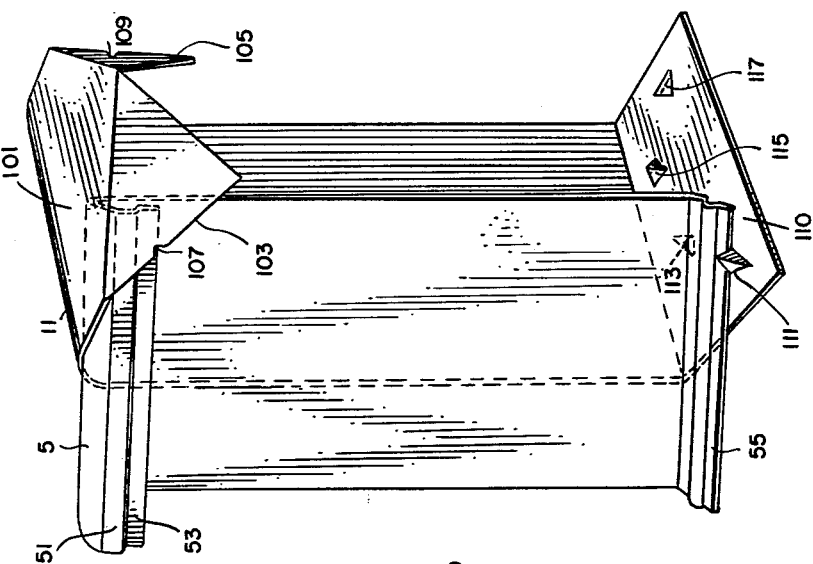
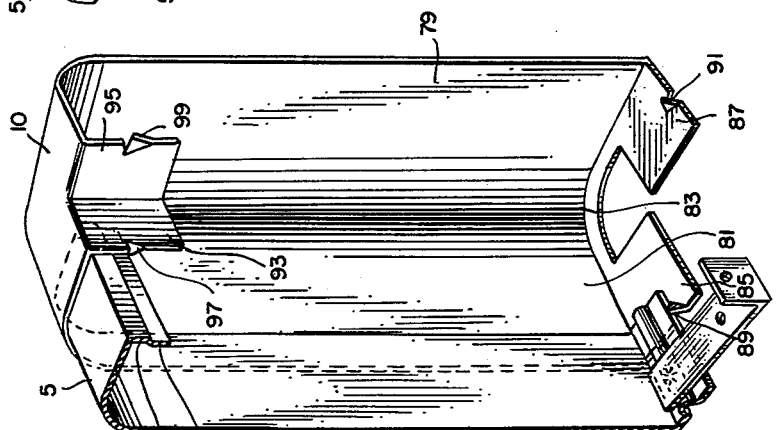
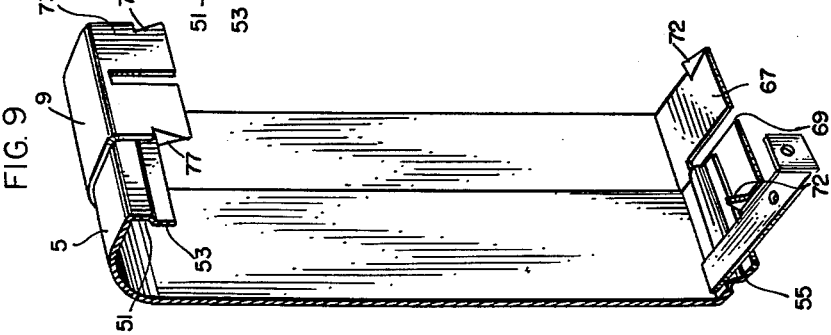
INVENTOR:
MARQUIS A. WOODS
BY
ATT'YS United States Patent Office 3,074,521
Patented Jan. 22, 1963

3,074,521
RADIANT PANEL ASSEMBLY
Marquis A. Woods, 9208 W. Grand Ave.,
Franklin Park, Ill.
Filed Mar. 2, 1959, Ser. No. 796,639
4 Claims. (Cl. 189—85)

This invention relates in general to improvements in radiant heating assemblies adapted to be placed around the perimeter of a space to be heated at either the floor or ceiling level.

One of the essential characteristics of the subject invention is the full realization of the advantages of radiant heating by an assembly which is remarkably easily assembled and which may be used in buildings particularly designed for its inclusion, or in buildings not so specifically designed.

In particular, the subject assembly provides freedom from noise, absence from dust distribution credited to the fact that there are no appreciable convection currents in rooms using this assembly and the maintenance of normal humidity, while providing an effective heating system which, experimental usage has shown, can deliver over four times its "rated output" based upon the currently accepted method of determining heat loss quantities and radiation outputs.

Therefore, it is an object of this invention to provide a highly efficient radiant panel assembly which, in operation is free from noise, provides no appreciable convection currents to distribute dust in the area to be heated, is adapted to maintain the normal humidity of the area, and may be easily and rapidly installed both in buildings designed particularly for its use, and in buildings not so designed.

The present invention is particularly designed to utilize the adjacent wall-floor or wall-ceiling areas as heat transmitting surfaces to significantly augment the radiant heat yielded by the system. In order to effectively utilize the wall-floor or ceiling surfaces as radiant heat transmitting surfaces, the instant assembly utilizes a plurality of stud brackets, radiant panels and other fittings which permit maximum heating of the wall and floor or ceiling surfaces adjacent a heating pipe. In the instant invention, this is accomplished by providing a maximum exposure of that portion of the wall and floor or ceiling which are behind, underneath or above the radiant panel.

Therefore, it is also an object of this invention to provide a radiant panel assembly which permits effective utilization of adjacent wall and floor or ceiling surfaces for transmitting radiant heat.

In this invention, a particular configuration of elements is used which takes advantage of the innate resiliency of the sheet metal used in constructing the various elements to maintain the assembly rigidly secured with respect to the wall and floor or ceiling and which will not become disassembled or loosened by accidental bumps or jars.

Therefore, it is a further object of this invention to provide a heating assembly in which the configuration of the individual elements utilizes the innate resiliency of the sheet metal of which they are made to retain the elements in a rigid secure relationship to the wall and floor or ceiling.

Further, in order to minimize the cost of radiant heating elements, the present assembly has been designed to be quickly and easily installed with the use of a minimum number of tools. In fact, the instant assembly can be installed with the use of only a hack saw and a hammer, the hack saw being used to cut the radiant panel into appropriate lengths and the hammer being used to secure the stud brackets to the wall.

Therefore, it is a further object of this invention to provide an improved radiant heating assembly which is adapted to be placed around the perimeter of the room to be heated and which may be installed with a minimum number of tools.

Also, in the use of radiant heating devices it has been recognized that certain areas of buildings and rooms are more difficult to heat than others. While the instant assembly utilizes a relatively large surface to radiate large quantities of heat, this radiation is ultimately dependent upon the heat of the pipe behind the panels. Thus, it has been found that providing those sections of pipe which are located in areas more difficult to heat with finned tubing, an increased heating of the corresponding section of the adjacent panel is caused which equalizes the effective radiant heat throughout the entire area.

Therefore, it is a further object of this invention to provide a radiant heating assembly which is used in combination with finned tubing on the pipe in the more difficult areas to heat in order to equalize the heating effectiveness throughout the entire area.

Further objects of the invention are to provide improved internal and external corner couplings and joiner strips which not only serve to seal the joints between successive sections and at corner bends but which also serve as rigid connectors between successive panel sections.

Other objects and advantages of the invention will become apparent as the description proceeds in accordance with the accompanying drawings illustrating a specific embodiment of the invention and in which:

FIG. 3 is a perspective view in fragmentary form of a section of the radiant panel assembly showing the mode of fastening a radiant panel on a stud bracket; the initial position of the panel in the mounting procedure being shown in dotted outline;

FIG. 4 is a rear perspective view of an improved stud bracket according to the invention;

FIG. 5 is a sectional side view showing the manner of fastening the upper portion of a radiant panel to a stud bracket;

FIG. 6 is a cross sectional view of a pipe mounting sleeve;

FIG. 7 is a perspective view showing the manner of securing a stud bracket to a wall;

FIG. 8 is a perspective view of a stud bracket attached to a wall and supporting a length of pipe preparatory to attachment of a radiant panel;

FIG. 9 is a rear perspective view showing a joiner strip secured over one end of a radiant panel;

FIG. 10 is a rear perspective view of an outside corner coupling shown secured over one end of a radiant panel; and FIG. 11 is a rear perspective view of an inside corner coupling secured to one end of a radiant panel.

Figure 1:
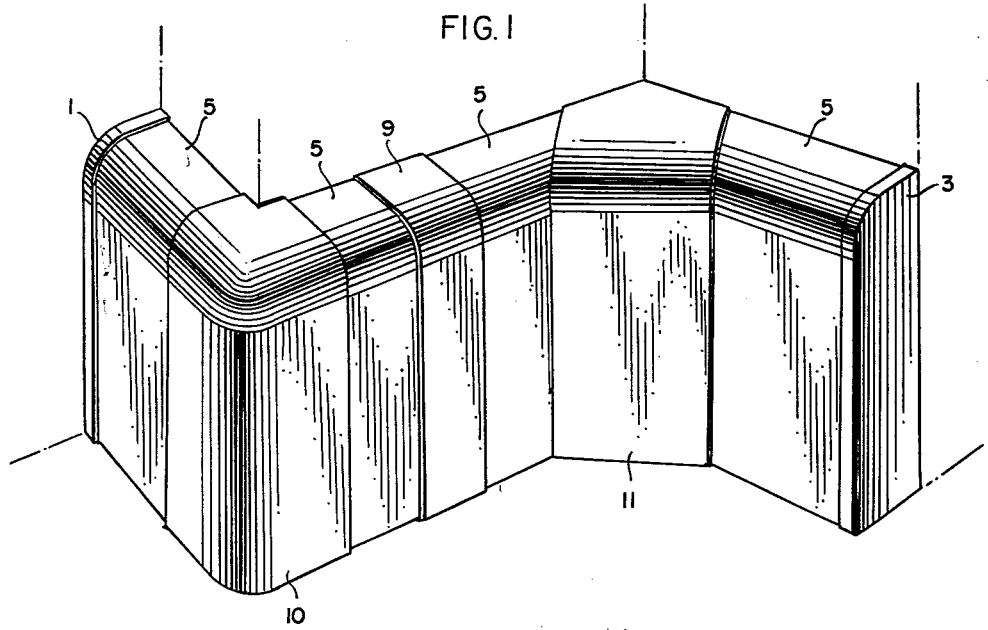
FIGURE 1 is a perspective view of an installation of an embodiment of the subject radiant panel assembly.

The embodiment shown in the drawings is for use as a baseboard assembly, although by a mere reversal of parts it may also be used adjacent the perimeter of a ceiling.

As seen in FIG. 1, the radiant panel assembly is comprised generally of a left-hand end cap 1, a right-hand end cap 3, a plurality of radiant panels 5, a joiner strip 9, an outside corner coupling 10, an inside corner coupling 11, and stud brackets 13 (FIG. 7).

As viewed in FIG. 7, stud bracket 13 is formed with an elongated, generally rectangular mounting base 15 having strengthening ribs 17 and 19 extending forwardly along each vertical edge to provide rigidity. The upper portion of the stud bracket is bent forwarly and inclined downwardly to form a depending flange 21. The upper portion of the stud bracket 13 is formed with a forwardly offset vertical shoulder 43, as seen in FIGS. 4 and 5, which is spaced from a vertically projecting tongue 45 which extends upwardly from and in the plane of the mounting base 15, the tongues 45 being struck from the material of the shoulder 43 as the latter is formed. The lower portion of the stud bracket 13 is bent forwardly to form bracket heel 29 which is provided with a downwardly turned bead 23 along the outer edge.

When installing the stud brackets, the radiant panel assembly is laid out in an approximate position. Appropriate studs are then marked for mounting of the stud brackets, which should be located approximately four feet apart for proper support of the panel although in no instance should the bracket be nearer than six inches from the joiner, corner or end cap fittings of the assembly. The panel may be put into approximate position adjacent the wall and leveled with shim stock 27. The baseboard panels are then removed, the shims being left in place, and the heel of the bracket 29 placed tightly on the floor or shim. Next, a generally cylindrically shaped mounting sleeve 31, made of relatively frictionless, heat resisting material such as "Teflon," is slipped onto a nail 33 which is then driven through the lower aperture 35 in stud bracket 13, the sleeve acting both as a spacer and as support for the pipe. A second nail 37 is driven through upper aperture 39 of stud bracket 13 to provide additional support. The pipe 7 may be held in appropriate position adjacent the wall and floor by blocks 41 until the stud brackets are appropriately mounted. Then, blocks 41 may be removed and the pipe 7 supported by the mounting sleeves 31 which permit the pipe 7 to move relatively freely, longitudinally, to accommodate expansion and other longitudinal movement. Also, at this time, finned tubing 12 may be provided on the pipe in areas which are difficult to be heated.

Each radiant panel 5 is formed with a flat vertical face 47, the upper surface of which is rounded and curved gradually rearwardly to form a substantially horizontal top portion 49. A continuous depending flange 51 extends downwardly from the rear edge of the top portion of the radiant panel and is formed with an offset surface 53 adjacent the lower edge set forwardly in relationship to the remainder of the flange. The lower portion of the panel is formed with a rearwardly projecting foot 55 having a continuous upwardly turned bead 57 extending throughout the middle portion. This continuous upwardly turned bead 57 not only adds rigidity throughout the length of foot 55 but also serves to secure the panel to the bracket, as seen in FIG. 3.

As shown in FIG. 3, the baseboard panel 5 is adapted to be secured to each of the stud brackets 13 in the following manner: The foot 55 of panel 5 is pushed inwardly beneath bracket heel 29 until bead 57 is moved past bead 23. The upper end of the baseboard panel 5 then is forced rearwardly and continued pressure causes the panel depending flange 51 to slide upwardly on depending flange 21 of stud bracket 13, flexing the panel 5 until it snaps into the space between tongue 45 and offset shoulder 43.

When the lower portion of radiant panel 5 is pushed under bracket heel 29, the resiliency of the bracket heel 29 opposes the wedging action of bead 57 and acts to force the panel foot 55 downwardly, pivoting the entire upper portion of the panel rearwardly around the lower panel edge and toward the depending flange 21. Further, when the depending flange 51 is pushed inwardly toward the bracket 15 and is moved upwarly on depending bracket flange 21 it is acting in opposition to the downward force of heel 29 on foot 55 causing the top portion of the panel to flex upwardly. Thus, when the depending flange 51 is pushed beyond the rear edge of flange 21, it snaps into the space between the offset shoulder 43 and the tongue 45, due to the resiliency of the panel. The panel is then held firmly and securely in relation to the wall.

Figure 2:
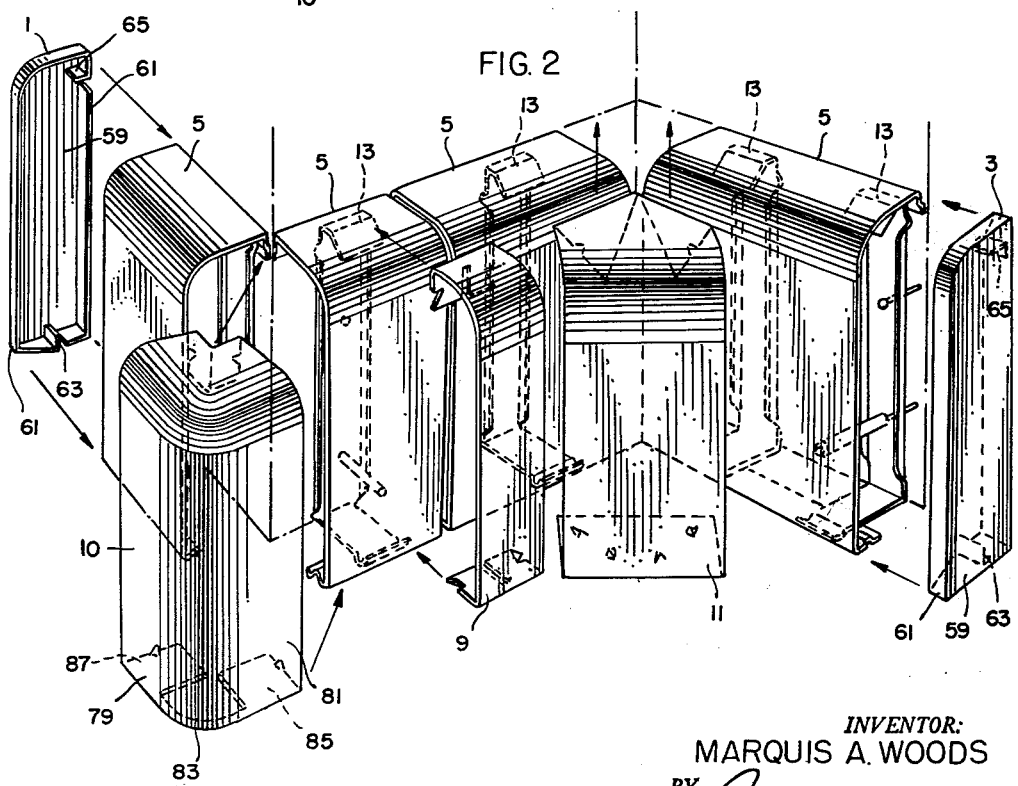
FIG. 2 is a view corresponding to FIG. 1 but showing the elements of the assembly in partially disassembled relationship.

The left and right-hand end caps 1 and 3 are mirror images of each other and are adapted to be placed on the corresponding ends of the panel 5. As best seen in FIG. 2, each end cap is formed with an end face 59 having a peripheral flange 61 extending completely around the edge of the end face and projecting inwardly, the rear and bottom portions being of greater width than the front and top portions to provide an effective mounting surface. The front and top portions of the flange are adapted to overlie the end of the panel 5. The bottom of the peripheral flange has a cut-out portion which is bent vertically to provide a spacing tab 63 adapted to abut the forward edge of the rearwardly projecting foot member 55 of the panel 5 when the end cap is secured on the end of the panel. The rear upper portion of the peripheral flange 61 is formed with a forwardly projecting spacing tab 65 which is adapted to abut the lower edge of depending panel flange 51 when the cap is positioned on the end of panel 5. The angle between the top and the front portion of the flange 61 is less than the angle between the top and face of the panel so that the end of the panel 5 must be slightly sprung to receive the end cap, the action of the panel in tending to return to its normal configuration retaining the end cap in place.

A joiner strip 9, best shown in FIG. 9, is also provided to seal the joint and provide a rigid connection between adjacent lengths of baseboard panel. Since the lengths of the panel will generally be provided in rather long sections from 10 to 18 feet in length, it will often be desirable to supplement a length with a partial length in order to conform the assembly to the dimensions of a particular room.

These joiner strips are essential in making a relatively air-tight fit between the panel lengths and for providing a relatively rigid connection between the panel lengths to preserve lineal continuity and thus enhance the appearance of the assembly. Joiner strips 9 are formed with an outer face having a conformation approximating the face of the baseboard panel 5 and are adapted to be placed over the ends of the adjacent baseboard panels 5 to provide a close overlying fit. The joiner strip 9 is provided with a lower rearwardly projecting foot 67 which is divided into two longitudinal sections by an elongated opening 69 which permits relative movement between the two portions of the foot to accommodate minor variation in floor level. Further, this joiner foot 67 is cut inwardly on each outside edge adjacent the rear end of the foot 67 and the rearward flap thus formed bent upwardly and inwardly along a line extending diagonally from the rear corner of the foot 67 to form a triangular spacer tab 72 having a forward edge adapted to abut the rear edge of foot 55 of panel 5 when the joiner strip is in place. The uppermost edges of the tabs 72 are thus inclined upwardly and forwardly from the plane of the foot 67 so that the foot 67 can, by a wedging action, be forced inwardly beneath the panel foot 55 when the joiner strip is applied.

The joiner strip is also formed with a downwardly projecting depending flange 73 at its upper end which flange is also divided into two longitudinal sections to provide adaptability. The outside edges of the depending flange 73 are split horizontally inward adjacent the lower end and the flaps thus formed are bent forwardly and inwardly as in the case of the tabs in the foot to form triangular spacing tabs 77 and 78 each having an upper edge adapted to abut the lower end edge of depending flange 51 of the adjoining panels. The forwardmost edges of the tabs are thus inclined upwardly and forwardly from the bottom edge of the flange 73, and as in the case of the end cap, the angle between the top and face of the joiner strip may be less than the angle between the top and face of the baseboard panel, the resiliency of the panel aiding in holding the strip firmly in place.

In securing the joiner strip to adjacent panels 5, first the depending flange 73 of the joiner strip is inserted between the depending flanges 51 of the panels and the wall until the spacing tabs 77 and 78 are pushed beneath the lower edge of each depending flange 51. The angularly disposed tabs progressively wedge the upper portion of panel 5 forwardly as the flange 73 is moved downwardly. The resiliency of the bracket 13, panel 5 and flange 21 causes the flange 51 to spring toward the wall when the tabs are pushed below the edge of flange 51, assuring that the tabs will project and be secured under the edge of flange 51. Then the lower end of the joiner strip is pushed inwardly, the joiner foot 67 being inserted under foot 55 of the panel 5, and the spacer tabs 72 being forced under foot 55 until they pass completely beneath the foot. Again the resiliency of the panel 5, foot 55 and bracket heel 29 yield to the progressive entrance of the inclined tabs 72 until they pass beyond the rear edge of the foot, the resiliency of these members forces the foot 55 downwardly assuring that the tabs will project upwardly over the rearward edge of the foot 55.

As shown in FIGS. 10 and 11, outside corner coupling 10 and inside corner coupling 11 are adapted to provide for uninterrupted panel radiation surface around the entire perimeter of a room.

Outside corner 10 is formed with two surfaces 79 and 81 corresponding generally in overall contour to and adapted to overlap the respective ends of the radiant panels 5 positioned substantially at a 270 degree angle with respect to each other adjacent an outside corner of the wall. Each of the surfaces 79 and 81 extends at substantially a 270 degree angle with respect to the other and are connected by an integral rounded portion 83 extending upwardly and rearwardly to provide a rounded corner between the two surfaces. Each outside corner is further provided with two lower, rearwardly extending foot portions 85 and 87, adjacent the end edge of each surface, each foot having a short longitudinal slit from the outer edge formed substantially parallel to the corresponding front face, the portion behind each slit being bent upwardly to form triangular spacing tabs 89 and 91 the uppermost edges of which are inclined upwardly and forwardly from the plane of the foot, and the forwardmost edges of the tabs being located to abut the rear edges of the feet 55 when inserted beneath the respective panels.

The upper ends of the two surfaces 79 and 81 are turned 90 degrees inward to form a unitary top end closure for the corner member and the rearward edges of this closure meet to form a substantially 90 degree angle adapted to fit against the outside wall corner and from which two depending flanges 93 and 95 extend vertically downwardly. Each of these flanges is provided with a short substantially horizontal slit in each of the outer edges, and the edge portions immediately below the slits are bent forwardly and inwardly on a diagonal line between the inner end of the slit and the outer edge of the flange to form triangular spacer tabs 97 and 99. The lower edges of these tabs are thus angularly inclined upwardly and forwardly and the upper surface of each of these tabs is adapted to abut the lower edge of the depending flange 51 of the baseboard panels on either side of the outside corner.

To assemble the outside corner, the depending flanges 93 and 95 are inserted behind the adjacent panels 5 at the upper portion and moved downwardly, the edges of the tabs pushing the panel flanges 51 forwardly until the spacer tabs 97 and 99 snap into position abutting the lower edges of depending flanges 51, the resiliency of the panels 5, flanges 51 and brackets 13 assuring that the tabs 97 and 99 project forwardly of the edge of the flange 51. Then the lower portion of the outside corner 10 is inserted under the feet 55 of panels 5 and pushed inwardly, the inclined edge of the spacer tabs 89 and 91 pushing the panels 5, feet 55, and bracket heel 29 upwardly until the tabs snap into position abutting the rear edge of each foot 55. The resiliency of the panel 5, feet 55 and heel 29 assures the positioning of the tabs to hold the corner securely. Again, the angle between the top and face of the outside corner surface may be less than the angle between the top and face of the radiant panel 5 so that when the external corner is positioned on the panels 5 its tendency to return to its original configuration aids in holding it in place.

Inside corner coupling 11 is formed with a flat outer face and a flat top portion, all having a contour corresponding to and adapted to follow that of a pair of radiant panels 5 disposed substantially perpendicularly to each other adjacent an inside corner of adjoining walls. In addition the internal corner member is formed with its right angular top portion 101 projecting rearwardly in a triangular formation to engage the surfaces of an inside wall corner. This triangular portion is equilateral and is formed with downwardly turned flanges 103 and 105 each of which is provided with a short horizontal slit extending inwardly from the outer edge at a distance below the top 101 substantially equal to the depth of the panel flange 51, the edge portion beneath each slit being bent inwardly and forwardly to provide triangular spacer tabs 107 and 109, the lowermost edges of which are inclined upwardly and forwardly from the plane of the respective flange. It is to be noted that these spacer tabs 107—109 are so spaced that when the depending flanges 103 and 105 are wedged behind the depending flange 51 are shown in FIG. 11, the substantially horizontal edges of the tabs 107 and 109 will snap into place abutting the lower edge of flange 51, the resilience of the panels 5, and brackets 13 assuring the positioning of the tabs.

The lower portion of the internal corner is formed with a rearwardly projecting rectangular flange 110. Two pairs of locking lugs are formed in the foot portion of the inner corner, each pair being spaced apart along a respective line extending at 45 degree angles with respect to the front face and edges of the flange 110. Each pair of lugs is spaced from the other pair so as to be aligned with and receive the rearwardly projecting foot 55 of the respective panels 5 therebetween. Spacing lugs 111, 113, 115 and 117 thus disposed are formed by stamping them from the metal of the foot portions at the appropriate locations. These opposing lugs act to retain the face portions of the inner corner 11, in tight abutment with the faces of the respective panels 5 adjacent the corner. The configuration of the internal corner coupling may be such that the upper portion is at a greater angle with respect to the face than in the upper portion of the radiant panels in respect to the face. In assembly, the upper flanges 103 and 105 are wedged downwardly behind the depending flanges 51 of the panel until the tabs snap into place abutting the lower edges of flanges 51. Then the lower portion of the inner corner is wedged inwardly until the projecting foot portions of the corresponding panel members are wedged upwardly by the forward lugs and are snapped into the space between the opposing lugs 111, 113, 115 and 117; the innate resiliency of the panel 5 and brackets 13 assure proper positioning of the inner corner member and act to hold it securely. The tendency of the inner corner to return to its normal configuration may also aid in securely holding the corner in place.

In disassembling the radiant panel assembly, it is merely required that a screw driver or other suitable prying tool be inserted between depending flange 51 of the panel and beneath the rearwardly projecting foot 55 of the panel, to disengage the respective tabs of the joiner strip 9, the outside corner 10 and the inside corner 11. These fittings may then be removed from the panel with ease. To remove the radiant panel 5 from the mounting brackets 15, the end of the panel 5 may be forced outwardly progressively along the panel length and disengaged from the feet of the mounting brackets 15. The panels may then be lifted upwardly to disengage the depending rear flanges of the panel from the upper ends of the brackets.

Accordingly, there has been provided a radiant panel assembly which is economical to manufacture and simple in construction, and which may be easily assembled by simply snapping the front panels onto the stud brackets attached to the wall; which provides a highly efficient radiation which in operation is free from noise, provides no appreciable convection currents to distribute dust in the area to be heated, is adapted to maintain the normal humidity of the area, and may be easily and rapidly installed both in buildings designed particularly for its use, and in buildings not so designed; which permits effective utilization of adjacent wall and floor or ceiling surfaces for the transmission of radiant heat; which may be used in combination with finned tubing on the pipe in the more difficult areas to heat in order to equalize the heating effectiveness throughout the entire area; which may be installed with a minimum number of tools; which utilizes a patricular configuration of the elements which takes full advantage of the innate resiliency of the sheet metal used in constructing the various parts and fittings to maintain the assembly rigidly secured with respect to the wall and floor or ceiling and which will not become disassembled or loosened by accidental bumps and jars; and which provides improved inside and outside corner couplings and joiner strips which not only serve to seal the joints between successive sections and at corner bends, but also serve as rigid connectors between successive panel sections.

Although I have herein set forth and described my invention with respect to certain specific embodiments thereof, it will be understood that numerous details may be altered or omitted without departing from the spirit and scope of the invention as set forth in the following claims:

I claim:

1. In a radiant panel baseboard assembly comprising a plurality of elongated panels mounted on and extending horizontally along the base of room walls, said panels being disposed in end to end relation to follow the contour of the wall at its intersection with a floor, each of said panels having a vertically extending face spaced outwardly from said wall and an integral upper portion curved upwardly and rearwardly to form a substantially horizontal top terminating in a vertically depending flange at its rearward edge adjacent the wall, and each of said panels having a foot portion projecting rearwardly from the lower edge of the panel face; a coupling member for connecting the adjoining ends of a pair of said panels, said coupling member having face and top portions overlapping the margins of the adjoining panel ends and being formed with a contour corresponding therewith, the top portion of said coupling member projecting to the respective rearward edges of said adjoining panels and having vertical downwardly extending flange means engaging behind the depending flange of the said panels, forwardly projecting tabs on the downwardly disposed margins of said flange means, each tab having a generally horizontal top edge engaging beneath the lower edge of the depending flange of a respective panel and a downwardly inclined edge terminating in the plane of the flange means, a rearwardly projecting foot means on said coupling member extending beneath the adjacent foot portion of an adjoining panel, and upwardly projecting lugs struck from the said coupling foot means and positioned to engage the rearward edge of the adjacent foot panel when said coupling member and panel are in overlapping engagement with each other.

2. The radiant panel baseboard assembly as defined by claim 1 wherein a pair of the panels are disposed in angular relation to each other with their adjoining ends at a corner formed by two intersecting walls, the top portion of the coupling member is formed with the said downwardly extending flange means disposed to follow the wall surfaces on each side of the said corner and engage behind the depending flanges of the respective panels, and the foot means of the coupling member is formed to extend beneath the adjacent foot portions of both adjoining panels.

3. A panel assembly of the class described comprising an inside corner coupling joining the ends of two angularly disposed elongated panel members secured horizontally adjacent the base of two walls intersecting to form an inside corner, each of said panels having a flat vertically extending face spaced outwardly from the respective wall the upper portion of which face is curved rearwardly to form a substantially horizontal top portion, a depending flange extending vertically from the rear edge of said top, and a foot projecting rearwardly from the lower edge of said panel face; said inside corner coupling comprising face and top portions having a contour corresponding to the face and top surfaces of the adjacent panel members, the top portions of said coupling projecting rearwardly and having side edges converging to form an angle corresponding to the corner angle of the intersecting wall, flanges extending downwardly from the side edges of said coupling top portion to lie against the surfaces of said walls, an inwardly turned tab on the forward edge of each said flange, the forward edge of each tab being inclined upwardly and forwardly toward a generally horizontal abutting edge engaging the lower edge of the depending flange of a respective panel, and the lower portion of said corner coupling being formed with a rearwardly projecting foot having two pairs of upwardly projecting lugs, the lugs of each pair being spaced apart along a line angled rearwardly from the coupling face toward a respective side edge of the coupling foot, the space between the mutually facing edges of each pair of the lugs on said coupling foot being sufficient to receive the rearwardly projecting foot of a respective panel member disposed with its face at an angle to the plane of the coupling face and abutting the adjacent vertical edge thereof.

4. A panel assembly of the class described comprising an outside corner coupling joining the ends of two elongated panel members each of which is mounted on and extends along the base of a respective wall, said walls intersecting to form an outside corner, each of said panel members having a flat vertically extending face spaced outwardly from the respective wall the upper portion of which face is curved rearwardly to form a horizontal top portion extending toward the wall, a depending flange extending vertically from the rear edge of said top portion, and a foot projecting rearwardly from the lower edge of the panel face; said outside corner coupling comprising two vertical face surfaces extending parallel with the surfaces of the respective panel members and corresponding generally in over-all contour to the adjacent ends of the said panel members, said coupling face surfaces being connected by means of an integral rounded corner portion, a foot extending inwardly toward a respective wall from the lower edge of each of said coupling face surfaces, the outer edge of each coupling foot including an upwardly projecting tab having a substantially vertical abutting edge spaced inwardly from the respective coupling face to engage the rear edge of the respective panel member foot with the inner surface of the coupling face held flatly against the face of the respective panel member, a rearwardly curved top portion on said coupling extending from said face surfaces to the respective walls, a depending flange extending vertically from the rearward edges of said top portion parallel with the surfaces of the respective walls, the outer edge of each of the last named flanges being provided with a forwardly projecting tab having a substantially horizontal upper edge engaging the lower edge of the depending flange on the respective panel member to secure the corner coupling against vertical displacement.

References Cited in the file of this patent

UNITED STATES PATENTS

| | | |
|---|---|---|
| 1,229,765 | Lehman | June 12, 1917 |
| 1,488,090 | Buhr | Mar. 25, 1924 |
| 1,930,242 | Lademann | Oct. 10, 1933 |
| 2,043,776 | Schaller | June 9, 1936 |
| 2,132,400 | Curren | Oct. 11, 1938 |
| 2,248,294 | Banfield | July 8, 1941 |
| 2,297,887 | Hall et al. | Oct. 6, 1942 |
| 2,656,156 | Wilcox | Oct. 20, 1953 |
| 2,731,242 | Borg et al. | Jan. 17, 1956 |
| 2,780,329 | Bedford | Feb. 5, 1957 |
| 2,835,478 | Bemish | May 20, 1958 |
| 2,855,186 | Brinen | Oct. 7, 1958 |